United States Patent [19]
Roy

[11] Patent Number: 5,494,309
[45] Date of Patent: Feb. 27, 1996

[54] SELF-LOADING PIGGYBACK-TYPE TRAILER UNIT

[75] Inventor: Claude Roy, Carignan, Canada

[73] Assignee: Les Machineries Procam Inc., Ste-Julie, Canada

[21] Appl. No.: 269,433

[22] Filed: Jun. 30, 1994

[51] Int. Cl.⁶ ........................................................ B60P 3/40
[52] U.S. Cl. ......................................... 280/401; 280/476.1
[58] Field of Search ................................. 280/401, 425.1, 280/476.1

[56] References Cited

U.S. PATENT DOCUMENTS 3,706,464  12/1972  Burrows et al. ................... 280/401
5,110,149  5/1992  Dahlstrom ........................ 280/401

FOREIGN PATENT DOCUMENTS 977000  10/1975  Canada .
582111  11/1977  U.S.S.R. ............................ 280/401

Primary Examiner—Mitchell J. Hill
Attorney, Agent, or Firm—Denton L. Anderson; Sheldon & Mak

[57] ABSTRACT

A trailer unit includes a front trailer section and a rear trailer section disposed in an aligned end-to-end relationship with a lift arm being pivotally connected at opposite ends thereof to the front and rear trailer sections. The rear trailer section includes a series of ground engaging wheels, whereas the front trailer section, when hitched to the tractor truck, is simply supported by the tractor truck's conventional fifth wheel. The trailer unit is adapted to be rigged to a conventional tractor truck with no important modifications having to be made thereto. Hydraulic cylinders are pivotally mounted at their cylinder ends to rear of the front trailer section and at their piston ends to the front end of the lift arm. When the cylinders are extended, a rear end of the lift arm is gradually pivoted upward and forward, whereby lifting the front end of the rear trailer section and carrying the same gradually onto the front trailer section. In the collapsed position of the trailer unit, the rear trailer section sits basically on the front trailer section while being also supported by the elevated lift arm with the weight of the rear trailer section being substantially centered over the fifth wheel and the rear wheels of the tractor truck, whereby the tractor trailer, in the collapsed position of the trailer unit, is very stable even though it does not carry an outside load, such as logs.

7 Claims, 9 Drawing Sheets

SELF-LOADING PIGGYBACK-TYPE TRAILER UNIT

BACKGROUND OF THE INVENTION

1. Field of the Invention

The present invention relates to a trailer unit especially for use with tractor trucks and, more particularly, to a multi-section trailer unit which, when empty, can self-load a rear section thereof onto a front section thereof, piggyback style.

2. Description of the Prior Art

Particularly in the hauling of logs, for instance from a logging operation to a log dump, lumber or pulp mill, open semi-trailers hitched to tractor trucks have been commonly used. These semi-trailers comprise basically an elongated flat bed for receiving the logs longitudinally thereon with uprights being provided at the sides of the semi-trailer for retaining the logs in a stacked relationship on the semi-trailer. Such semi-trailers are sometimes difficult to handle, especially when exempt of a hauling load, whereby it becomes desirable to carry the semi-trailers, when empty, on the tractor. Various self-loading and unloading systems for tractor-trailer combinations have used a cable and winch system to pull the trailer forward and upward onto the rear frame section of the tractor.

Such cable based systems did not provide adequate control of the movement of the trailer and were also relatively unsafe. Accordingly, improvements have been made to such self-loading systems, such as the loading system of U.S. Pat. No. 3,706,464 issued on Dec. 19, 1972 to Burrows et al. The loading system of this U.S. Patent is designed for loading and unloading a trailer which is releasably connected to a fifth wheel of a tractor onto the rear portion of this tractor. The tractor includes power means which are connected to the fifth wheel which itself is connected to a front end of the trailer. The loading system further comprises a lift arm and an elevatable bell crank which are operable by the power means and, more particularly, by the hydraulic cylinder thereof. More particularly, the lift arm is pivotally attached at one end thereof to the sub-frame of the tractor and at the opposite end thereof to a central section of the bell crank. The bell crank is pivotally attached at its respective ends to the fifth wheel and to the power means. Accordingly, the double-acting power cylinder interconnects the tractor frame and the bell crank. When actuated, the cylinder raises the lift arm, the bell crank and the fifth wheel forward and upward over the rear frame of the tractor thereby causing the empty trailer coupled to the fifth wheel to be pulled onto the tractor until the trailer wheels are supported on the rear frame of the tractor. Accordingly, in the system disclosed in U.S. Pat. No. 3,706,464, it is necessary to substantially modify the rear of the tractor and, more particularly, a new fifth wheel assembly is required and a drive system for displacing the fifth wheel must be added to the tractor, this loading system including mainly a double-acting hydraulic cylinder, a lift arm and a bell crank. Furthermore, a rearward most end of the tractor must be provided with a ramp and side brackets for supporting and guiding the trailer wheels during the loading and unloading of the trailer onto or from the tractor truck.

Similarly, Canadian Patent No. 977,000 issued on Oct. 28, 1975 to Isley also discloses a log hauling equipment in which the tractor truck is provided with trailer loading means, the trailer including a longitudinally oriented telescopic main member and trailer wheels provided at a rear end of the main member. The front end of the main member is coupled to the loading mechanism provided at a rear end of the tractor truck. The loading system comprises a lift arm pivotable in a vertical plane by way of hydraulic cylinders between a ground position wherein the lift arm or coupling bar extends substantially horizontally rearwards of the tractor and is basically collinear with the main member of the trailer, and a carry position wherein the lift arm extends forwardly from its pivot point and substantially opposite its position in the ground position of the trailer. Accordingly, actuation of the hydraulic cylinders causes the lift arm to pivot upwards and forwards toward the tractor cab thereby causing the trailer which has its main member in a telescopically collapsed position to climb on ramps provided at a rearward most end of the tractor truck until the trailer wheels rest on the rear portion of the tractor truck.

As in the aforementioned U.S. Patent, Canadian Patent No. 977,000 necessitates substantial modifications to the tractor. Furthermore, in both systems, the center of gravity of the trailer, in the carry position thereof onto the tractor, is located rearwards of the conventional location of the fifth wheel of the tractor above and longitudinally between the double-axelled rear wheels of the tractor. In other words, the weight of the trailer, in the carry position, is not ideally centered over the rear wheels of the tractor. Accordingly, the tractor can become substantially thrown off balance.

SUMMARY OF THE INVENTION

It is therefore an aim of the present invention to provide a self-supporting, self-loading piggyback-type trailer unit for use with various motor vehicles, such as tractor trucks, agricultural tractors, etc.

It is also an aim of the present invention to provide a multi-section self-loading piggyback-type trailer unit having at least a front and a rear section, the front section being adapted to be connected in a conventional manner to a conventional tractor truck and including a loading system for powering a lift arm pivotable about the front section and rearwardly connected to the rear section of the trailer unit.

Therefore, in accordance with the present invention, there is provided a trailer unit comprising at least front and rear trailer sections adapted to be displaced between a first position wherein said trailer unit is in an extended load carrying position thereof and a second position wherein said trailer unit is in a collapsed position thereof, said front and rear sections in said extended position being disposed in a substantially aligned and end-to-end relation, said front trailer section being adapted to be attached to a motor truck or the like and to be at least partly supported thereby, said rear section comprising wheels for support thereof on the ground, a lift means provided on said front section and connected to said rear section, said lift means being adapted to be displaced between a first position wherein said trailer unit is in said extended position and a second position wherein said trailer unit is in said collapsed position, said wheels of said rear section being supported by the ground in said extended position, and lift means being adapted to lift said rear section and gradually displace said rear section upwardly and forwardly until said collapsed position wherein said rear section is substantially located on top of said front section and is at least partly supported thereby.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
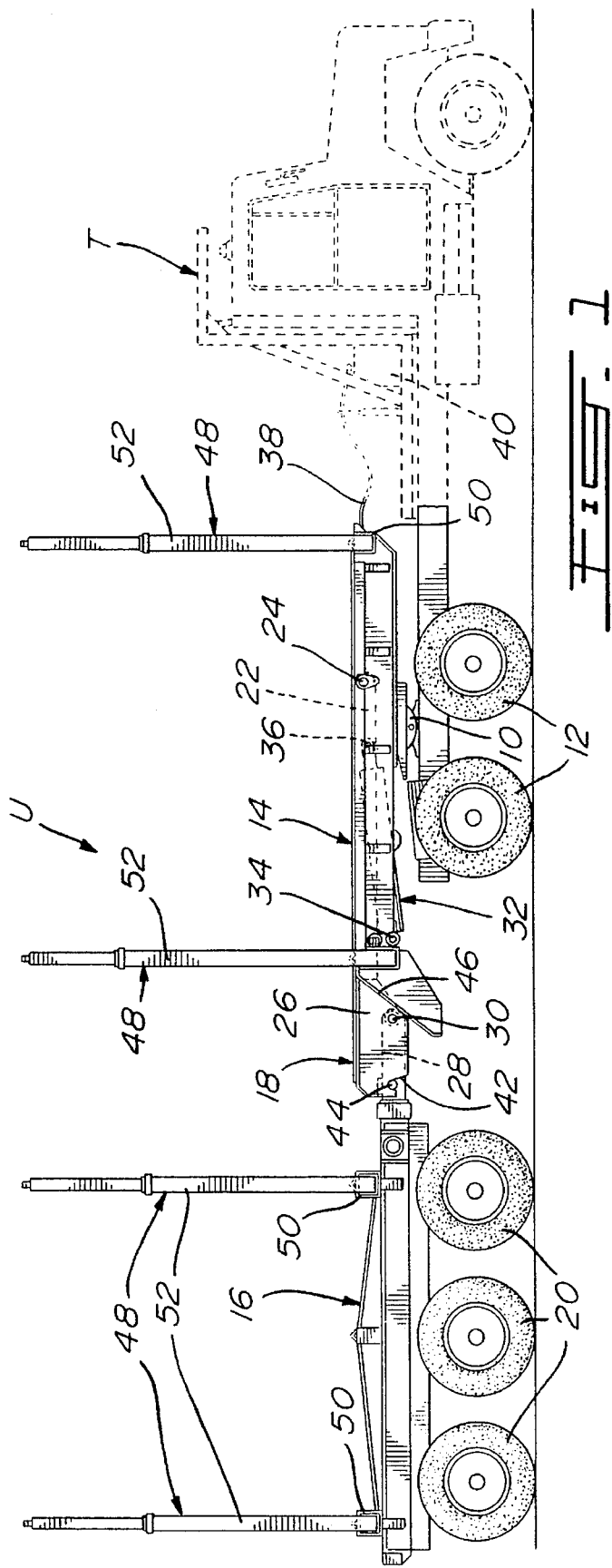
FIG. 1 is a side elevational view of a trailer unit in accordance with the present invention which is shown attached to a conventional tractor truck and in a fully extended position thereof.

FIG. 1 illustrates a tractor trailer comprised of a conventional tractor truck T (which is shown partly in phantom lines) and a trailer unit U in accordance with the present invention. Although any motor truck can be used, e.g. tractor, etc., the illustrated tractor truck T typically includes a fifth wheel 10 so that the trailer unit U can be conventionally rigged thereto. Conventional trailers used with tractor trucks such as the tractor truck T of the present drawings and also specialized trailers such as those proposed in aforementioned Canadian Patent No. 977,000 and U.S. Pat. No. 3,706,464 all include rear wheels provided on two or more axles at the rear of the trailer with the front of the trailer extending therefrom cantilever-type forwards in such a way that the front portion of the trailer, when attached to the fifth wheel of the tractor truck, is supported by the rear wheels of the tractor truck located beneath the fifth wheel thereof. Therefore, in each of such trailers, the load carried by the trailer is supported at a rear end thereof by the rear wheels of the trailer and at a front end thereof by the rear wheels of the tractor truck. In the present drawings, reference numeral 12 has been given to the rear wheels of the tractor truck T which are mounted in a standard manner on two axles. Also in a conventional manner, the fifth wheel 10 is located above the rear wheels 12 of the tractor truck T so as to provide an adequate support for the front part of and of the load carried thereby in view of the configuration of the trailer unit U which will now be described in details.

Figure 5:
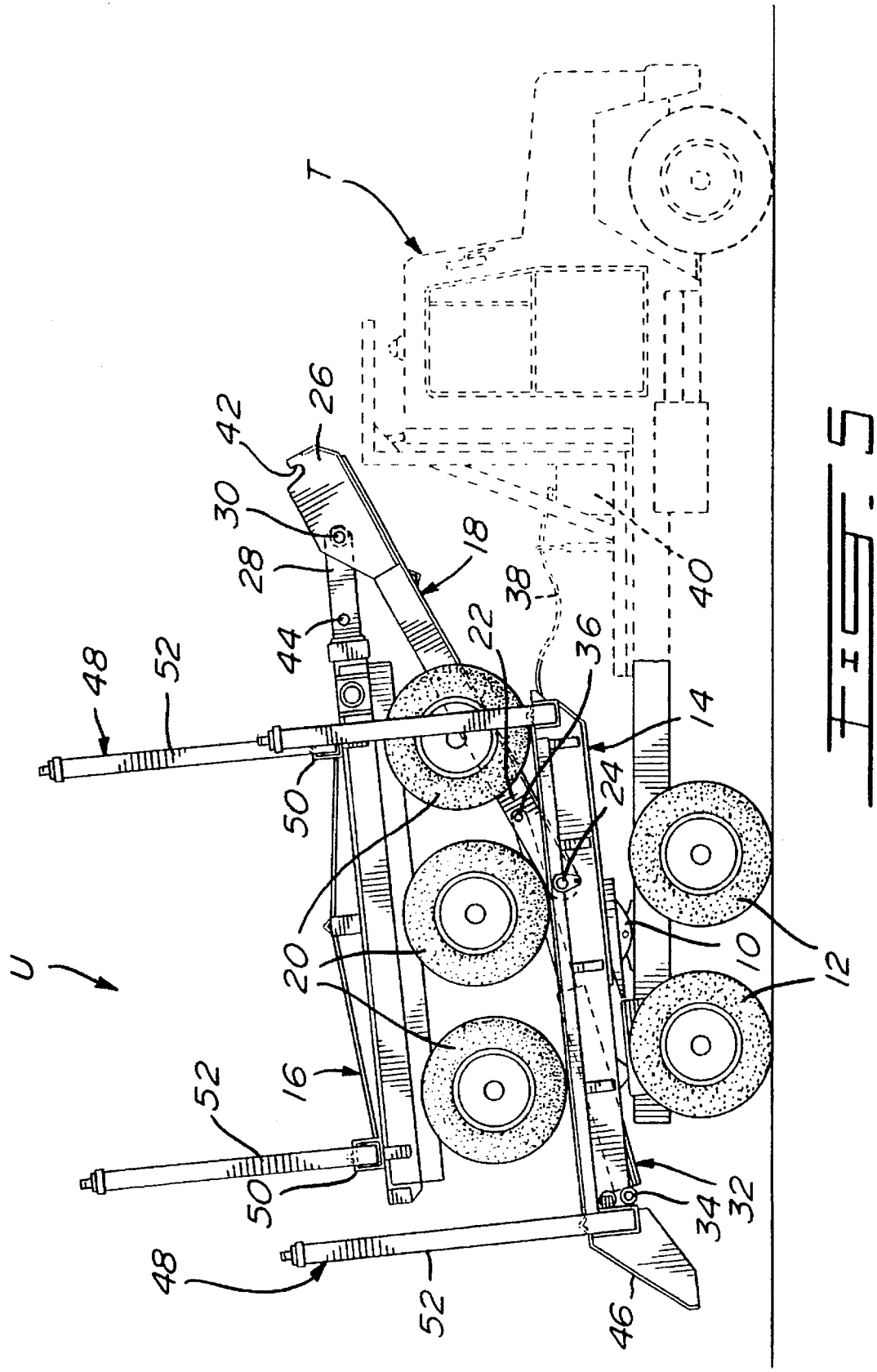

Basically, the trailer unit U of the present invention is a multi-section trailer comprising two such sections in the present embodiment, that is a front trailer section 14 and a rear trailer section 16 with a lever or lift arm 18 pivotally connecting the front and rear trailer sections 14 and 16 one to another. In the load carrying extended position of FIG. 1, the present trailer unit U has, for example, an overall length of approximately 42 feet and, in a collapsed position thereof as seen in FIGS. 5, a reduced length of between 31 and 32 feet; the distance extending between the rear end of the rear trailer section 16 and the rear end of the lift arm 18, in the extended position of the trailer unit U shown in FIG. 1, is in such a case, slightly under fifteen feet.

The rear trailer section 16 is supported by twelve (12) wheels 20 mounted on three (3) axles. The front trailer section 14 is adapted to be hitched in a conventional manner to the fifth wheel 10 of the tractor truck T.

The lift arm 18 is pivotally mounted at a front end 22 thereof to the front trailer section 14 with the pivot therebetween being indicated by reference numeral 24, and is also pivotally connected at a rear end 26 thereof to a front, substantially short, cantilever-type extension arm 28 of the rear trailer section 16 with the pivot therebetween being indicated by reference numeral 30.

Figure 2:
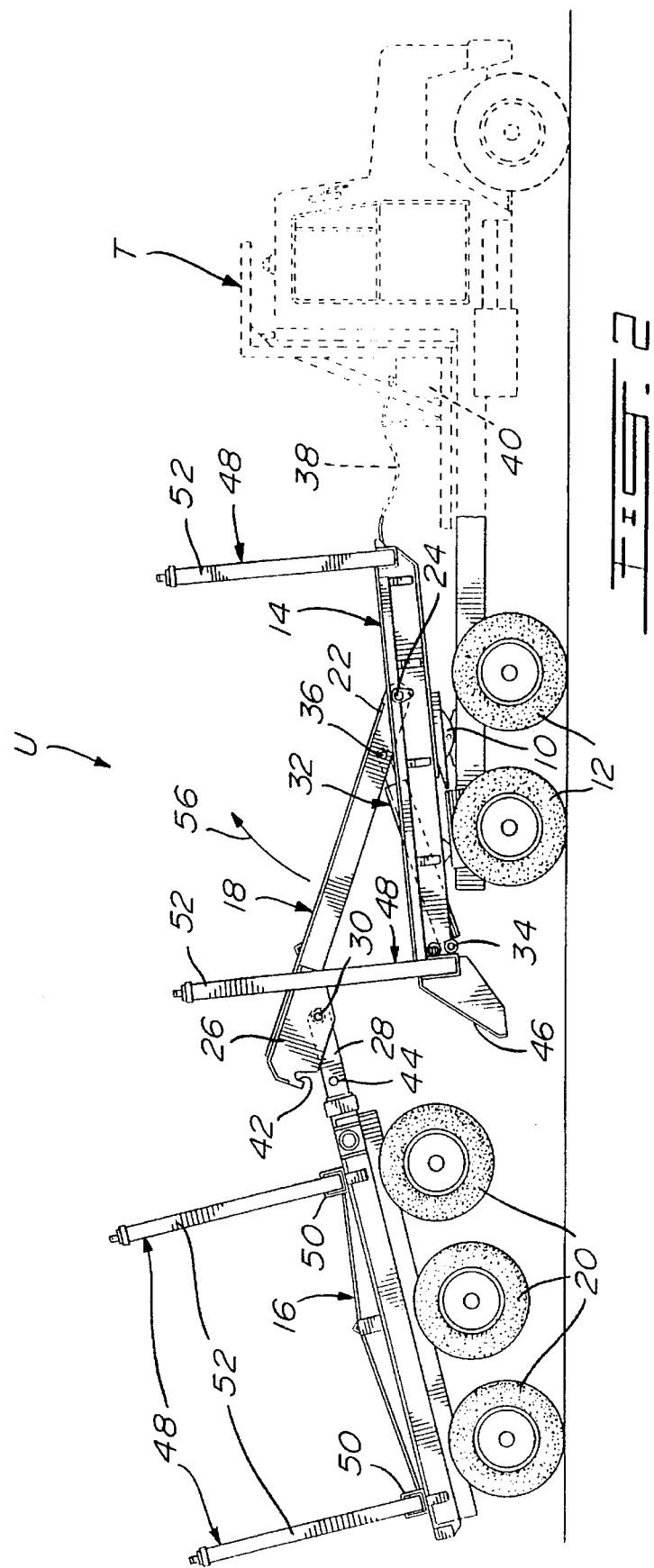
FIGS. 2 to 5 are side elevational views showing various successive positions of the trailer unit of FIG. 1 during the loading of a rear section thereof onto a front section thereof in accordance with the present invention with FIG. 5 showing the trailer unit in a fully collapsed self-supporting carry position thereof.
Figure 3:
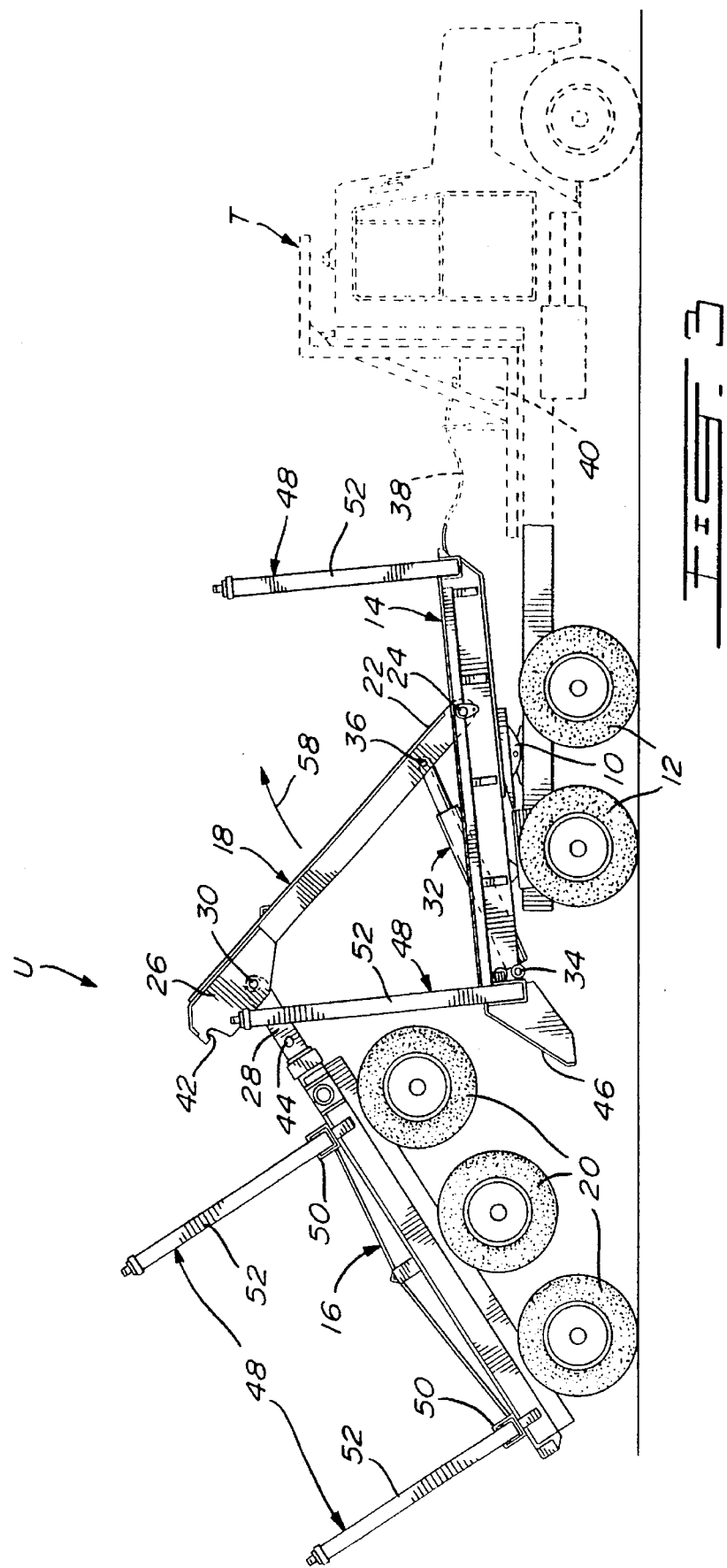
Figure 4:
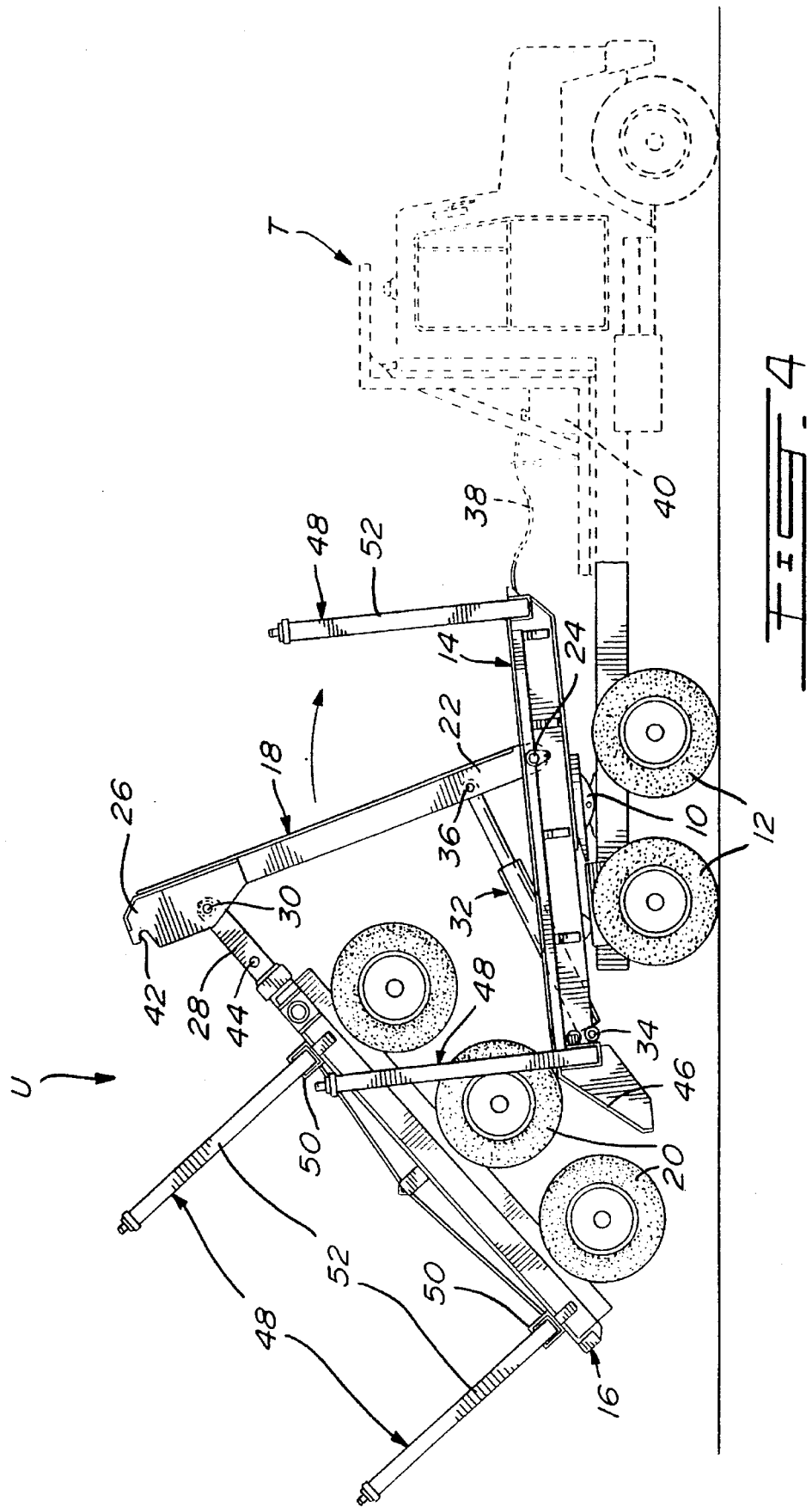

A pair of parallel cylinders 32 are pivotally mounted at respective cylinder ends thereof to the rear of the front trailer section 14 and, more particularly, at pivot 34, and at respective piston ends thereof to the lift arm 18 and reference is made to pivot 36. When the cylinders 32 are retracted, the trailer unit U is in its fully extended position shown in FIG. 1, whereas when the cylinders 32 are extended the trailer unit U is in the fully collapsed position thereof shown in FIG. 5, with FIGS. 2 to 4 illustrating various successive positions of the cylinders 32 and thus of the trailer unit U between its fully extended and collapsed positions. The cylinders 32 are of the hydraulic type, whereby oil is supplied thereto by hose 38 which is in fluid communication with oil tank 40 mounted on the tractor truck T. The cylinders 32 could also be operated with compressed air and, furthermore, various other motor means could be used to cause the pivot of the lift arm 18 which allows the trailer unit U to displace between its fully extended and fully collapsed positions.

In the fully extended position of the trailer unit U shown in FIG. 1, the downward pivot of the lift arm 18 is limited by a semi-circular recess 42 defined in the underside of a rear end thereof engaging a transversal stop pin 44 fixedly mounted to the front arm 28 of the rear trailer section 16 slightly rearward of the pivot 30.

Before reviewing in more details the displacement of the trailer unit U between the fully extended, load carrying, position thereof of FIG. 1 and the fully collapsed, storage, position thereof of FIG. 5, some other features of the trailer unit U will now be described. The wheels 20 of the rear trailer section 16 are mounted thereto with a spring suspension having, for instance, a 90,000 pound capacity. The rear of the front trailer section 14 defines on the sides of the lift arm 18 a pair of longitudinally oriented inclined ramps 46 onto which the wheels 20 of the rear trailer section 16 can roll when the trailer unit U is being moved between the extended position thereof and the collapsed position thereof so as to at least partly support and guide the rear trailer section 16 towards (or away from) its collapsed piggyback position thereof on top of the front trailer section 14 as illustrated in FIG. 5.

At the front end of the front trailer section 14, there are provided at least a pair of collapsible legs or posts (not shown) which, in the functional position thereof, extend vertically between the front of the front trailer section 14 and the ground for supporting the front end of the trailer unit U when the same is not supported by a tractor truck T. Such legs or posts are well known in the art of semi-trailers.

Figure 6:
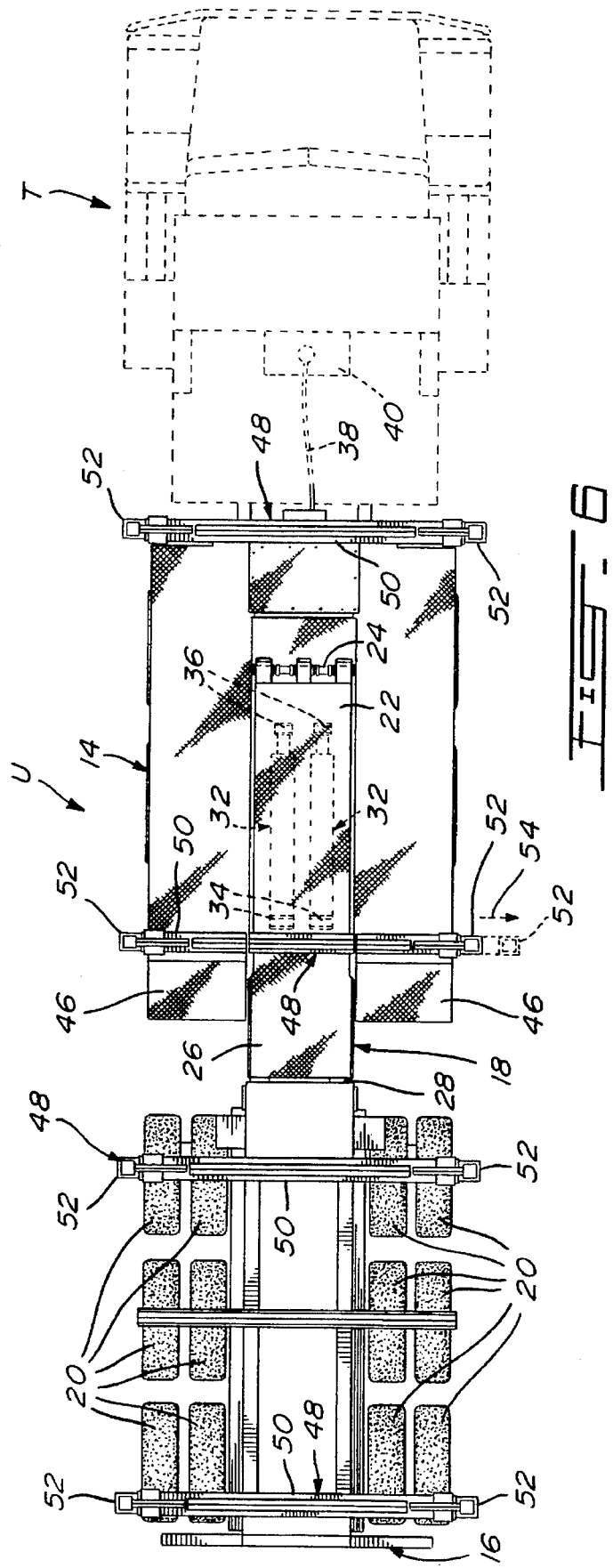
FIG. 6 is a top plan view of the trailer unit hitched to the tractor-trailer of FIG. 1 in the load carrying functional extended position thereof.
Figure 7:
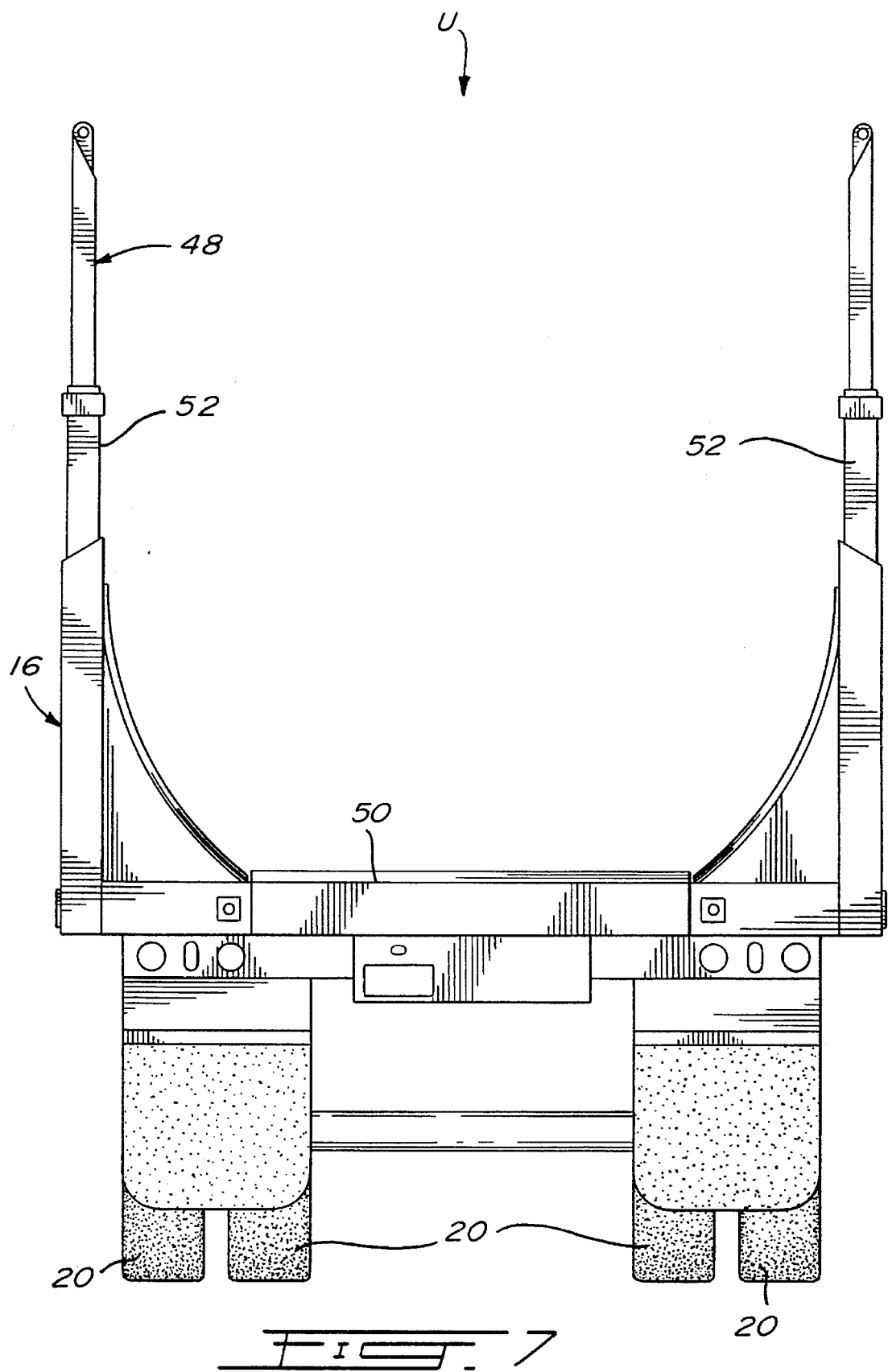
FIG. 7 is a rear elevational view of the trailer unit of FIG. 1.

A pair of spaced U-shaped forked log supports 48 is provided on each of the front and rear trailer sections 14 and 16, with such a U-shaped log support 48 being best seen in the rear elevational view of the trailer unit U shown in FIG. 7. The log supports 48 each extends substantially vertically in planes transversal to the longitudinal axis of the trailer unit U. More particularly, on each of the front and rear trailer sections 14 and 16, there are provided a front and a rear log support 48. Each log support 48 includes a transversal log supporting horizontal lower beam 50 and a pair of vertical post assemblies 52 which extend vertically from the opposite ends thereof and which can be adapted to pivot or collapse to its storage, possibly horizontal, position. Also, these post assemblies 52 can be transversely displaceable, in a translational vertical motion, outwardly in the case of the front trailer section 14 or inwardly in the case of the rear trailer section 16 with a view of allowing the post assemblies 52 of the rear trailer section 16 to pass between the post assemblies 52 of the front trailer section 14 when the trailer unit U is displaced between the extended and collapsed positions thereof. Preferably, as in the present embodiment (see FIG. 6), at least the rear post assemblies 52 of the front trailer section 14, and possibly also the front post assemblies 52 thereof (depending on how the rear trailer section 16 is displaced with respect to the front trailer section 14), can be displaced transversely outwardly of the front trailer section 14, along arrow 54 of FIG. 6, by way of horizontally extending hydraulic cylinders (not shown) so as to increase the span of the forked log supports 48 of the front trailer section 14 for allowing the rear trailer section 16 to pass between these widened log supports 48 of the front trailer section 14 when the rear trailer section 16 is being displaced by the lift arm 18 forwardly onto or rearwardly out of the front trailer section 14.

Now referring to FIGS. 1 to 5, it is easily seen how the gradual extension of the cylinders 32 acting on the lift arm 18 causes the rear trailer section 16 to move from the ground engaging, fully extended and functional, position thereof shown in FIG. 1 to the piggyback position thereof on top of the front trailer section 14 as illustrated in FIG. 5. More particularly, the initial extension of the cylinders 32 causes the lift arm 18 to pivot along arrow 56 of FIG. 2 thereby causing the front of the rear trailer section 16 to be lifted up from the ground with the trailer section 16 only engaging the ground at the rearward most set of wheels thereof. With reference to FIG. 3, the continuing extension of the cylinders 32 causes the lift arm 18 to gradually displace toward a vertical position as per arrow 58, wherein the front of the rear trailer section 16 becomes positioned above the rear of the front trailer section 14. In the almost vertical position of lift 18 shown in FIG. 4, the wheels 20 of the rear trailer section 16 are no longer in contact with the ground and are now supported at a rear end of the front trailer section 14 and, more particularly, at or near the ramps 46 thereof. As seen in FIG. 5 where the lift arm 18 extends forward from its pivot 24, the rear trailer section 16 is completely mounted, piggyback style, onto the front trailer section 14 with the wheels 20 of the rear trailer section 16 being supported by the horizontal bed of the front trailer section 14. As it will be appreciated from FIG. 5, the weight of the rear trailer section 16 is substantially centered above the fifth wheel 10 and the rear wheels 12 of the tractor truck T, whereby the collapsed trailer unit U does not throw off balance the tractor trailer, that is the combination of the tractor truck T and the trailer unit U.

Figure 8:
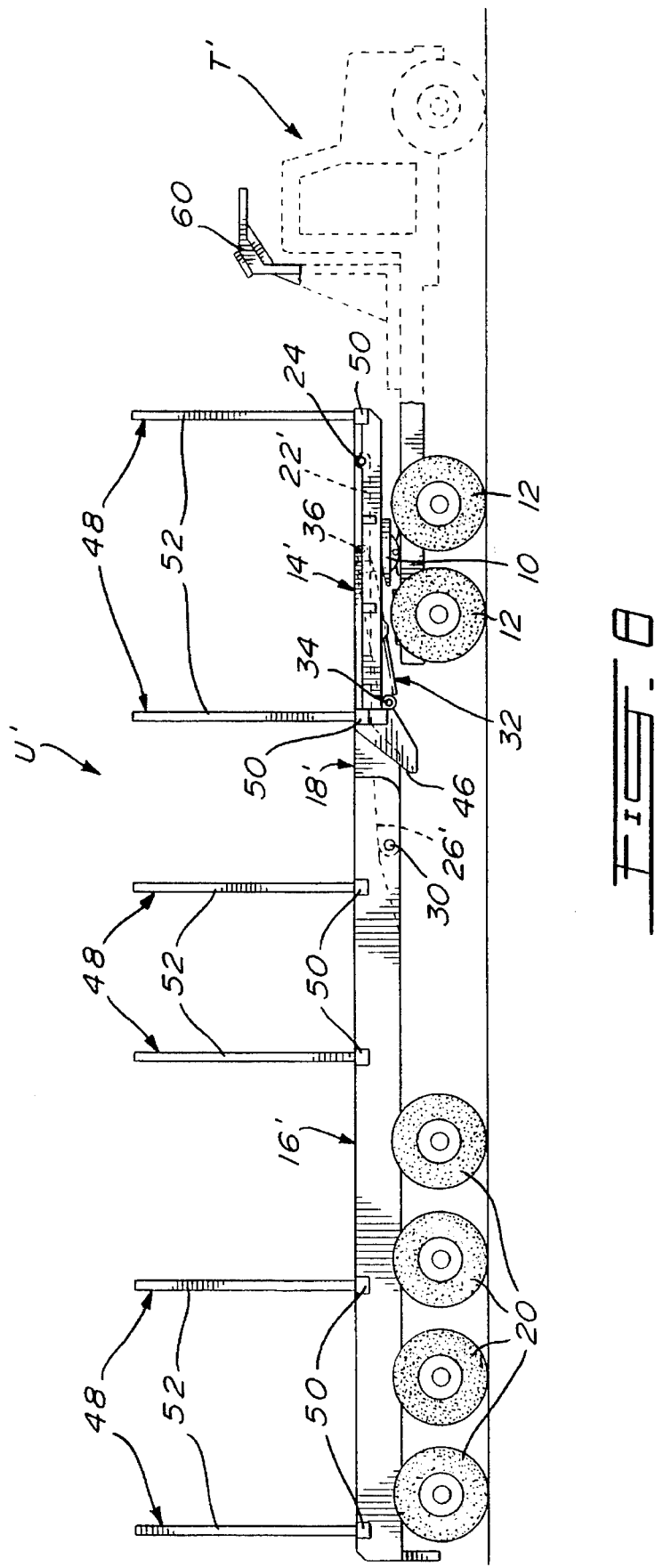
FIG. 8 is a side elevational view of another embodiment of a trailer unit in accordance with the present invention which is shown in a load carrying functional extended position thereof and which is shown connected to a conventional tractor truck.
Figure 9:
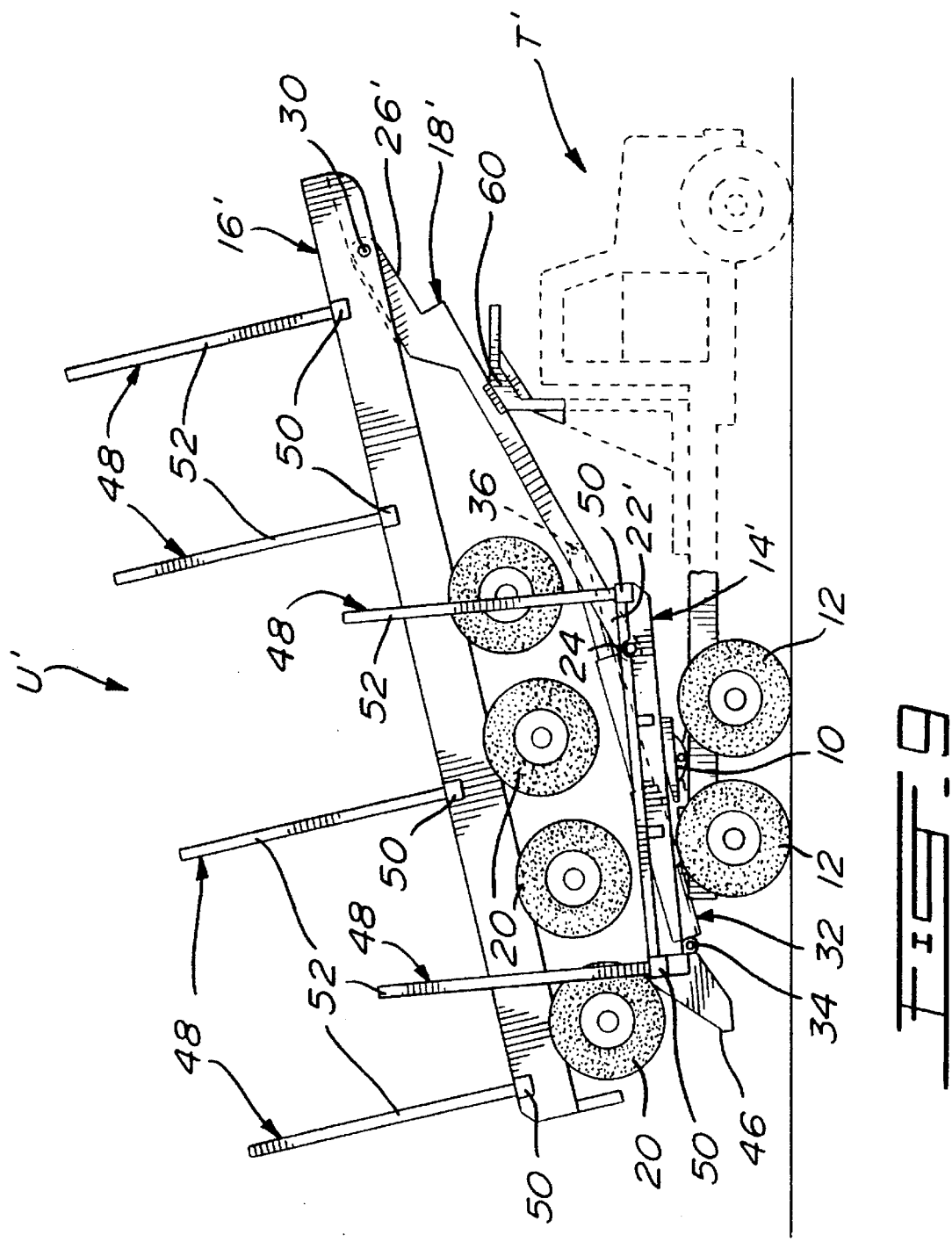
FIG. 9 is a side elevational view of the trailer unit of FIG. 8 but showing the trailer unit in a collapsed carry position thereof.

Now referring to FIGS. 8 and 9 which show an alternative trailer unit U' in accordance with the present invention, wherein the trailer unit U' is essentially longer than the trailer unit U of FIGS. 1 to 7 and is slightly modified accordingly with respect thereto. For example, the trailer unit U' can have an overall fully extended length of approximately fifty-one (51) feet with the rear trailer section 16' thereof including sixteen (16) wheels 20 mounted on four (4) axles. When collapsed, the lift arm 18' of the trailer unit U' might be supported by the tractor truck T', as seen in FIG. 9, which may have to be modified so as to be reinforced, e.g. by way of a supporting structure 60 provided above the cab of the tractor truck T'.

The front trailer section 14' of the trailer unit U' of FIGS. 8 and 9 is essentially similar to the front trailer section 14 of the trailer unit U of FIGS. 1 to 7. The rear trailer section 16', as opposed to the rear trailer section 16 of FIGS. 1 to 7, does not include a front arm 28 although the rear end 26' of the lift arm 18' is still pivotally mounted at pivot 30 to the front of the rear trailer section 16'. In FIGS. 8 and 9, the recess 42 of the lift arm 18 and the stop pin 44 of the rear trailer section 16 of the trailer unit U of FIGS. 1 to 7 are not represented and it is contemplated that the retraction of the cylinders 32 will be sufficient once the rear trailer section 16' is fully supported at the wheels 20 thereof by the ground.

The cylinders 32 of the trailer unit U' can be hydraulically operated as in FIGS. 1 to 7 although in FIGS. 8 and 9 the hose 38 and the oil tank 40 are not shown. Again, other types of cylinders or even other power means can be used to operate the lift arm 18' of the trailer unit U', as for the trailer unit U of FIGS. 1 to 7. The rear trailer section 16' includes four forked log supports 48 in view of the fact that it is longer than the rear trailer section 16 of the trailer unit U of FIGS. 1 to 7.

Therefore, when collapsed, the rear trailer section 16' of the trailer unit U' extends forwardly above the cab of the tractor truck T' with the lift arm 18' being possibly supported by the supporting structure 60 provided on the tractor truck T'. In the case of the trailer unit U', the wheels 20 thereof might not all be supported by the bed of the front trailer section 14' (see FIG. 9), but rather the rear trailer section 16' can be supported at the rear thereof by the rear end of the front trailer section 14' and at the front thereof by the supporting structure 60 of the tractor truck T'. In any event, as for the trailer unit U of FIGS. 1 to 7, the rear trailer section 16' of the trailer unit U' has its weight substantially centered over the fifth wheel 10 and the rear wheels 12 of the tractor truck T'. As seen in FIG. 9, in view of the overall pivot of the lift arm 18', the cylinders 32 can each include a required amount of telescoping piston sections.

From the above, it is readily understood that the present trailer units U and U' and variants thereof in accordance with the present invention are self-loading and thus do not require substantial structural modifications to the tractor truck as in the prior art. Furthermore, with the trailer unit of the present invention, the rear trailer section in its piggyback position on top of the front section does not throw the tractor trailer off balance.

I claim:

1. A self-loading trailer unit for supporting a load and allowing the load to be transported with the aid of a vehicle, said trailer unit comprising at least front and rear trailer sections adapted to be displaced between a first position wherein said trailer unit is in an extended load carrying position thereof and a second position wherein said trailer unit is in a collapsed position thereof, said front and rear trailer sections in said extended position being disposed in a substantially aligned and end-to-end relationship, said front trailer section being adapted to be attached to the vehicle, said rear trailer section comprising wheels, lift means provided on said front trailer section and connected to said rear trailer section, said lift means being adapted to displace said rear trailer section between said extended position and said collapsed position, wherein said lift means is adapted to lift said rear trailer section and to gradually displace said rear trailer section upwardly and forwardly until in said collapsed position, said rear trailer section in said collapsed position being substantially located on top of said front trailer section and being at least partly supported thereby.

2. A trailer unit as defined in claim 1, wherein said front trailer section comprises a wheel-less platform adapted to be attached to the vehicle.

3. A trailer unit as defined in claim 2, wherein said platform comprises conventional attachment means adapted to be detachably mounted to a conventional fifth wheel provided on a bed on the vehicle, whereby said trailer unit is self-sufficient and can be hitched to the vehicle without having to make any modifications to the vehicle.

4. A trailer unit as defined in claim 1, wherein at least said front trailer section is provided with at least one forked load support, at least a rearwardmost load support of said at least one load support being displaceable such as to vary the span thereof.

5. A trailer unit as defined in claim 4, wherein each load support comprises a pair of substantially vertical posts disposed transversely on one side and another of said front trailer section with the posts of at least said rearwardmost load support being transversely horizontally displaceable such as to selectively vary a distance therebetween, whereby said posts are moved away from one another when said rear trailer section is displaced by said lift means toward said collapsed position for allowing said rear trailer section to displace forwardly between said posts.

6. A trailer unit as defined in claim 5, wherein said front trailer section comprises at least two forked load supports each adapted for relatively displacing posts thereof.

7. A trailer unit as defined in claim 1, wherein said lift means comprises a pivotable lift arm pivotally mounted at opposite front and rear ends thereof respectively to said front trailer section and to a front end of said rear trailer section, and further comprises cylinder means pivotally connected at a rear end thereof to said front trailer section and at a front end thereof to said lift arm and rearwardly of said front end of said lift arm, said cylinder means being selectively operable between a retracted position thereof wherein said lift arm extends substantially horizontally and rearwardly from said front end thereof with said trailer unit being in said extended load carrying position, and an extended position wherein said lift arm extends forwardly from said front end thereof with said rear trailer section being located on said front trailer section in said collapsed position of said trailer unit.

* * * * *